United States Patent
Espinel et al.

(10) Patent No.: US 6,562,443 B1
(45) Date of Patent: May 13, 2003

(54) COOK-IN PACKAGE WITH TIGHT APPEARANCE

(75) Inventors: R. Karina Espinel, Duncan, SC (US); Ram K. Ramesh, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/120,931

(22) Filed: Jul. 22, 1998

(51) Int. Cl.$^7$ .......................... B32B 27/00; B65B 53/02
(52) U.S. Cl. .................. 428/213; 428/34.9; 428/220; 428/412; 428/474.7; 428/475.8; 428/476.1; 428/476.3; 428/483; 428/516; 428/518; 428/519; 428/910; 156/244.24; 156/85; 264/173.12; 264/173.13; 264/173.14; 264/173.15; 264/173.19
(58) Field of Search ................ 428/34.9, 516, 428/518, 476.1, 213, 219, 212, 220, 475.8, 476.3, 483, 910, 474.7, 412, 519; 156/244.24, 84–86; 264/173.12, 173.13, 173.14, 173.15, 173.19

(56) References Cited

U.S. PATENT DOCUMENTS

| | | | |
|---|---|---|---|
| 3,076,232 A | * 2/1963 | Dengler | 264/237 |
| 4,064,296 A | 12/1977 | Bornstein et al. | |
| 4,120,716 A | 10/1978 | Bonet | 156/272 |
| 4,348,437 A | 9/1982 | Lustig et al. | 428/34.9 |
| 4,457,960 A | 7/1984 | Newsome | |
| 4,495,249 A | 1/1985 | Ohya et al. | |
| 4,678,836 A | 7/1987 | McKinney et al. | |
| 5,053,259 A | 10/1991 | Vicik | 428/36.91 |
| 5,139,805 A | 8/1992 | Tada et al. | 426/412 |
| 5,206,075 A | 4/1993 | Hodgson, Jr. | 428/216 |
| 5,241,031 A | 8/1993 | Mehta | 526/348.1 |
| 5,272,236 A | 12/1993 | Lai et al. | 526/348.5 |
| 5,278,272 A | 1/1994 | Lai et al. | 526/348.5 |
| 5,344,679 A | 9/1994 | Vicik | 428/36.91 |
| 5,480,945 A | 1/1996 | Vicik | 525/432 |
| 5,534,277 A | 7/1996 | Ramesh et al. | 426/129 |
| 5,549,943 A | 8/1996 | Vicik | 428/34.8 |
| 5,698,279 A | 12/1997 | Vicik | 428/34.8 |
| 5,763,095 A | 6/1998 | Ramesh et al. | 428/474.4 |
| 5,837,335 A | * 11/1998 | Babrowicz | 428/34.9 |
| 5,837,358 A | 11/1998 | Bauer et al. | 428/213 |
| 5,843,502 A | 12/1998 | Ramesh | 426/127 |
| 5,866,214 A | 2/1999 | Ramesh | 428/34.8 |
| 6,274,228 B1 | * 8/2001 | Ramesh et al. | 428/213 |

FOREIGN PATENT DOCUMENTS

| | | |
|---|---|---|
| AU | 717644 | 7/1996 |
| EP | 0 331 509 A2 | 9/1989 |
| JP | 56-136365 | 10/1981 |

* cited by examiner

*Primary Examiner*—Rena Dye

(57) ABSTRACT

A heat shrinkable film suitable for use in cook-in applications is provided which exhibits a transverse direction free shrink at 50° C. of less than about 2% and a transverse direction free shrink at 57° C. of at least about 3%. The food contact layer includes a polymer having a surface energy of at least about 0.034 J/m$^2$ and a second layer includes at least one member selected from the group consisting of polyester, polyvinylidene chloride, polyamide and polyalkylene carbonate. Preferably, the desired shrink properties are attained by annealing the film under controlled conditions.

30 Claims, No Drawings

COOK-IN PACKAGE WITH TIGHT APPEARANCE

BACKGROUND INFORMATION

1. Field of the Invention

The present invention relates generally to heat-shrinkable films suitable for cook-in applications. The present invention is also directed to articles of manufacture which are useful for packaging proteinaceous products. The present invention is particularly related to a process for packaging a proteinaceous product in a heat-shrinkable film.

2. Background of the Invention

Many food products are processed in thermoplastic film packages by subjecting the packaged product to elevated temperatures produced by, for example, immersion in hot water or exposure to steam. Such thermal processing often is referred to as cook-in, and films used in such processes are known as cook-in films.

A food product that is packaged and processed in this manner can be refrigerated, shipped, and stored until the food product is to be consumed or further processed by, for example, slicing and repackaging into smaller portions for retail display. Alternatively, the processed food can be removed immediately from the cook-in package for consumption or further processing (e.g., sliced and repackaged).

A cook-in film must be capable of withstanding exposure to rather severe temperature conditions for extended periods of time while not compromising its ability to contain the food product. Cook-in processes typically involve a long cook cycle. Submersion in hot (i.e., about 55° C. to 65° C.) water for up to about 4 hours is common; submersion in 70° to 100° C. water or exposure to steam for up to 12 hours is not uncommon, although most cook-in procedures normally do not involve temperatures in excess of about 90° C.

Following the cook-in process, the film or package preferably conforms, if not completely then at least substantially, to the shape of the contained food product. Often, this is achieved by allowing the film to heat shrink under cook-in conditions so as to form a tightly fitting package. Alternatively, the cook-in film package can be caused to shrink around the contained food product prior to initiating the cook-in procedure by, for example, placing the package in a heated environment prior to cooking. Also, during cook-in the film should preferably have food product adherence to restrict "cook-out," i.e., the collection of juices between the surface of the contained food product and the food-contact surface of the packaging material. In this manner, product yield is increased by the food product retaining moisture.

Various meat products, such as pork, sausage, poultry, mortadella, bologna, beef, braunsweiger, etc. are prepared as cook-in products. Other non-meat products such as soybean also are considered to be proteinaceous. In all the above cases, it is important to obtain adequate film-to-food adhesion and provide a snug package for superior aesthetic appearance.

For cook-in applications, packaging materials typically are produced in roll form and then converted into shirred sticks, bags, pouches, etc., for the end user. In the past, heat-shrinkable packaging films which have been provided to the cook-in end-user undesirably have been characterized by inconsistent widths. This inconsistency arises because of two primary reasons. First, heat-shrinkable films have significant free shrink at temperatures as low as 50° C., in some cases 45° C., and in some cases, as low as 40° C. Thus, upon exposure to environments where the temperature exceeds 40° C. and sometimes 45° C., the heat-shrinkable film partially shrinks, causing a change in its width. Obviously, this is more of a problem during storage or transportation of heat-shrinkable films in the hotter summer months. Second, heat-shrinkable films are produced in roll-form. When films are wound into rolls, the leading edge of the film being rolled typically experiences higher tension than the outer portions of the roll. Since polymers are viscoelastic in nature, the film material at the outer portions of a roll (which is under little/no tension) tends to 'snap back' like a rubber band, relaxing some of the strain imparted by the orientation process. However, film material at the inner portion of the roll is under tension and therefore unable to relax or snap back. This can result in film which is the first used from the roll, i.e., the outer portions of the roll, having a significantly lower width than film at the interior of the roll. Consequently, heat-shrinkable films can vary in width as much as 5%, and in extreme situations, as much as 7% or 10%.

The marketplace continues to express a need for films which are more consistent in width and are dimensionally stable when exposed to temperatures of 40° C., 43° C., 47° C. or even 50° C. This demand arises from the need to stuff the same quantity of meat product into each casing length, especially where the film is formed into shirred casings. In such cases, the width of the packaging material preferably varies less than 3%, more preferably, less than 2%. Packages produced from shirred casings often are cooked in molds, with the cooked meat-product then being sliced. An inconsistent film width will result in an inconsistent package size and, therefore, in significantly greater yield loss.

To provide the end-user with film that is more consistent in width, film manufacturers often anneal the heat-shrinkable cook-in films. Typically, a moving web of film is heated to an elevated temperature in a continuous process. Upon heating the film to an elevated temperature (typically as high as 60° C.), the film shrinks and reduces in width. As a result of this shrinking, the film has now lost some or all of its ability to shrink at or near that elevated temperature. If the process of heat-treatment at an elevated temperature is conducted with a moving web, rather than a roll of film, the process also reduces or eliminates width variation in the film due to the viscoelastic nature of the film (as described above). Thus, the process of annealing produces a film with a more consistent width.

However, the process of annealing as described above can produce other disadvantages. For example, cooked packages produced from some annealed films can be relatively flaccid because the film does not fit snugly around the packaged product, creating an unsightly package which includes cook-out from the underlying food product. Such cook-out is evidenced even when the heat-shrinkable film includes a food-contact surface which would be expected to provide adequate film-to-meat adhesion to prevent substantial purge or cook-out.

Thus, providing a film which exhibits good width stability during transportation and storage in hot environments, yet remains suitable for cook-in applications which require adequate adhesion remains desirable. Such a film also preferably would have the ability to conform to the food product during cooking and after the cook-in process and prevent substantial purge loss/cook-out, thereby providing a tight, more aesthetically pleasing package.

SUMMARY OF THE INVENTION

Briefly, the present invention provides a heat-shrinkable multilayer film that includes at least two layers. One of these layers is an outer layer that includes a polymer that has a surface energy of at least about 0.034 J/m². The other layer includes at least one of the following polymers: polyester, polyvinylidene chloride, polyamide and polyalkylene carbonate. The film of the present invention has a transverse direction free shrink of at least about 3% at 57° C. and a transverse direction free shrink of less than about 2% at 50° C. The film also can include one or more other layers. The heat-shrinkable film of the present invention is particularly useful for cook-in applications, especially those involving the packaging of meat-products. The present invention provides several unexpected and surprising advantages in the packaging of meat-products. For example, the present invention provides a tight package after the cook-in process, while still providing a film which has low shrink (i.e., is dimensionally stabilized) at temperatures as high as 50° C. The present invention also provides good film-to-food adhesion and, in addition, provides a package with significantly reduced cook-out or purge.

Articles made from the above-described film (e.g., shirred casings, clipped casings and bags), and processes for packaging products in the above-described film are also provided.

As a second aspect, the present invention is directed to a heat-shrinkable, annealed film, suitable for cook-in applications. The film comprises a first outer layer which serves as a food-contact layer and includes a polymer having a surface energy of at least about 0.034 J/m². The film also comprises a second layer which comprises at least one member selected from the group consisting of polyester, polyvinylidene chloride, polyamide and polyalkylene carbonate. The film has a transverse direction free shrink at 57° C. of at least about 3%.

Preferably, the film has a transverse direction free shrink at 57° C. of at least about 4%. More preferably, the film has a transverse direction free shrink at 57° C. of at least about 5%. The film preferably has a transverse direction shrink tension at 57° C. of at least about 0.3 MPa. Preferably, the transverse direction shrink tension at 57° C. is at least about 0.7 MPa. Preferably, the film has a longitudinal direction shrink tension at 57° C. which is from about 70% to about 130% of the transverse direction shrink tension at 57° C. Preferably, the film has a transverse direction free shrink at 57° C. of less than about 10% and more preferably, less than 7%. Preferably, the film has a transverse direction free shrink at 80° C. of at least 10% but less than 25%. Preferably, the film has a transverse direction free shrink at 80° C. of less than about 21%.

Preferably, the film further comprises a third layer comprising at least one member selected from the group consisting of ethylene/vinyl alcohol copolymer (EVOH), polyvinylidene chloride (PVDC), polyalkylene carbonate, polyamide, and polyester. Preferably, the film further comprises a layer comprising at least one member selected from the group consisting of polyolefin, polystyrene, polyamide, polyester and polyurethane. Preferably, the film further comprises a tie layer. Preferably, the second layer comprises at least one member selected from the group consisting of polyamide 6, polyamide 66, polyamide 6/66 and polyvinylidene chloride. Preferably, the first layer comprises an ethylene/unsaturated acid copolymer.

Preferably, the film comprises less than about 80% polyamide. Preferably, the film comprises from about 15 to about 60% polyamide. Also, preferably, the film comprises from about 30 to about 80% polyolefin. Preferably, the film has a Young's Modulus of less than about 700 MPa. Preferably, the film has an oxygen permeance of less than about 40 cm³/m²×atm×24 hours.

As a third aspect, the present invention is directed to a heat-shrinkable film, comprising less than about 90% polyolefin (by weight). The film comprises a first outer layer which serves as a food-contact layer and includes a polymer having a surface energy of at least about 0.034 J/m². The film also comprises a second layer which comprises at least one member selected from the group consisting of polyester, ethylene/vinyl alcohol copolymer, polyvinylidene chloride, polyamide and polyalkylene carbonate. The film has a transverse direction free shrink at 57° C. of at least about 3%, a transverse direction free shrink at 50° C. of less than about 2% and a transverse direction free shrink at 80° C. of less than about 26%.

As a fourth aspect, the present invention is directed to a heat-shrinkable, annealed film, comprising less than about 90% polyolefin (by weight). The film comprises a first outer layer which serves as a food-contact layer and includes a polymer having a surface energy of at least about 0.034 J/m². The film also comprises a second layer which comprises at least one member selected from the group consisting of polyester, ethylene/vinyl alcohol copolymer, polyvinylidene chloride, polyamide and polyalkylene carbonate. The film has a transverse direction free shrink at 57° C. of at least about 3% and a transverse direction free shrink at 80° C. of less than about 26%.

As a fifth aspect, the present invention is directed to a process of making a heat shrinkable film suitable for use in cook-in applications which includes the steps of coextruding a first outer layer which serves as a food-contact layer and which includes a polymer having a surface energy of at least about 0.034 J/m² and at least one further, second layer which includes a polyester, PVDC, a polyamide or polyalkylene carbonate, orienting the coextruded tape at a temperature of at least 60° C. and no greater than 140° C., allowing the resulting preliminary oriented film material to cool, and then heating the preliminary heat shrinkable film material to an elevated temperature of at least about 35° C. and no greater than 100° C. The film has a transverse direction free shrink at 57° C. of at least about 3% and a transverse direction free shrink at 50° C. of less than about 2%.

To assist in understanding the more detailed description of the invention that follows, certain definitions are provided immediately below. These definitions apply herein throughout unless a contrary intention is explicitly indicated.

As used herein, the phrase "free shrink" refers to the percent dimensional change in a 10 cm×10 cm specimen of film, when subjected to selected heat (i.e., at a certain temperature), with the quantitative determination being carried out according to ASTM D 2732, as set forth in the 1990 *Annual Book of ASTM Standards*, Vol. 08.02, pp.368–371, which is hereby incorporated, in its entirety, by reference thereto.

As used herein, the phrase "shrink tension" refers to the force per average cross-sectional area developed in a film, in a specified direction and at a specified elevated temperature, as the film attempts to shrink at that temperature while being restrained (measured in accordance with ASTM D 2838).

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that in general, up to the outer 3 mils of a film can be involved in the sealing of the film to itself or another layer, the phrase "seal layer," and the like, refer herein only to the outer layer(s) which is to be heat-sealed to itself, another film, etc. Any inner layers which contribute to the sealing, performance of the film are herein designated as "seal-assist" layers. With respect to packages having only fin-type seals, as opposed to lap-type seals, the phrase "sealant layer" generally refers to the inside layer of a package, the inside layer being an outer layer which frequently also serves as a food contact layer in the packaging of foods. However, in a multilayer film, the composition of the other layers (within 3 mils of the inside surface) can also affect sealability and seal strength.

As used herein, the term "heat-seal," and the phrase "heat-sealing," refer to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

As used herein, the term "barrier," and the phrase "barrier layer," as applied to films and/or layers, is used with reference to the ability of a film or layer to serve as a barrier to one or more gases. In the packaging art, oxygen (i.e., gaseous $O_2$) barrier layers have, in general, included, for example, ethylene/vinyl alcohol copolymer, polyvinylidene chloride (PVDC), polyalkylene carbonate, polyamide, polyethylene naphthalate, polyester, polyacrylonitrile, etc., as known to those of skill in the art.

As used herein, the phrases "abuse layer", as well as the phrase "puncture-resistant layer", refer to any layer which serves to resist abrasion, puncture, and other potential causes of reduction of package integrity, as well as potential causes of reduction of package appearance quality. As used herein, the phrase "skin layer" refers to an outside layer of a multilayer film in packaging a product, this skin layer being subject to abuse.

As used herein, the term "core", and the phrase "core layer", as applied to multilayer films, refer to any internal layer which preferably has a function other than serving as an adhesive or compatibilizer for adhering two layers to one another. Usually, the core layer or layers provide the multilayer film with a desired level of strength, i.e., modulus, and/or optics. and/or added abuse resistance, and/or specific impermeability.

As used herein, the phrase "tie layer" refers to any internal layer having the primary purpose of adhering two layers to one another. In one preferred embodiment, tie layers can comprise any polymer having a polar group grafted thereon, so that the polymer is capable of bonding to polar polymers such as polyamide and ethylene/vinyl alcohol copolymer. Preferred polymers for use in tie layers include, but are not restricted to, ethylene/unsaturated acid copolymer, ethylene/unsaturated ester copolymer, anhydride-grafted polyolefin, polyurethane, and mixtures thereof As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

As used herein, the phrase "thickness uniformity" refers to percent value obtained by measuring the maximum and minimum thickness of the film and applying these numbers to the following formula:

$$\text{Thickness Uniformity } (\%) = \frac{\text{film thickness}_{(min)}}{\text{film thickness}_{(max)}} \times 100.$$

The maximum and minimum thicknesses are determined by taking a total of 10 thickness measurements at regular distance intervals along the entirety of the transverse direction of a film sample, recording the highest and lowest thickness values as the maximum and minimum thickness values, respectively, and computing the thickness uniformity (a percent value) using the formula above. A thickness uniformity of 100% represents a film of absolute thickness uniformity, i.e., no measurable differences in thickness, in contrast, a film in which the film thickness(min) is measured at 45% of the film thickness(max) has a thickness uniformity of only 45%.

As used herein, "EVOH" refers to ethylene/vinyl alcohol copolymer, i.e., polymerized ethylene vinyl alcohol. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50%, and more preferably, at least 85%. Preferably, the EVOH comprises from about 28 to about 48 mole % ethylene, more preferably, from about 32 to about 44 mole % ethylene, and even more preferably, from about 38 to about 44 mole % ethylene.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described.

As used herein, the term "oriented" refers to a polymer-containing film which has been stretched at an elevated temperature (the orientation temperature), followed by being "set" in the stretched configuration by cooling the material therefore retaining the stretched dimensions. Upon subsequently heating unrestrained, unannealed, oriented polymer-containing material to its orientation temperature, heat shrinkage is produced almost to the original unstretched, i.e., pie-oriented dimensions. As used herein, "oriented" films are stretched in the solid state as contrasted to blown films which are stretched in the melt state. More particularly, the term "oriented", as used herein, refers to oriented films and articles fabricated from oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by cooling the extrudate to a solid state and (below the crystallization temperature), reheating the film to its softening temperature, and then introducing compressed air between two nip rolls to produce a standing trapped bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the phrase "machine direction", herein abbreviated "MD", or "longitudinal direction", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "heat-shrinkable," "heat-shrink," and the like, refer to the tendency of a film, preferably an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained). The multilayer films of the invention can be annealed or heat-set to reduce the free shrink either slightly or substantially.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist of a single polymer (with or without non-polymeric additives), or can have still additional polymers together therewith, i.e., blended therewith.

As used herein, the term "mer" means that portion of a polymer derived from a single reactant molecule, for example, a mer unit from ethylene has the general formula—$CH_2CH_2$—;

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "interpolymer" means a polymer that includes mer units derived from at least two reactants (normally monomers) and is inclusive of copolymers, terpolymers, tetrapolymers, and the like, As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, solution polymerization and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, tetrapolymers, etc., preferably the first monomer copolymerizes in a higher weight percent than the second monomer, and the second monomer copolymerizes in a higher weight percent than the third monomer, etc.

For addition polymers, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mers" derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i,e., a narrower molecular weight distribution. Furthermore, homogeneous polymers are typically prepared using metallocene, or other single-site type catalysts, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to about 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefins. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 9/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "anhydride-containing polymer" and "anhydride-modified polymer", means a group containing an anhydride moiety, such as that derived from maleic acid, fumaric acid, etc., has been chemically attached to or affiliated with a given polymer;

As used herein, the term "permeance" (in the packaging industry, "permeance" often is referred to as "transmission rate") means the volume of a gas (e.g., $O_2$) that passes through a given cross section of film (or layer of a film) at a particular temperature and relative humidity when measured according to a standard test such as, for example, ASTM D 1434 or D 3985.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (TM) linear homogeneous ethylene/alpha olefin copolymer resins obtainable from the Exxon Chemical Company, of Baytown, Tex., bimodal interpentrating networks comprising heterogeneous and homogeneous ethylene/alpha olefins such as SclairTech resins from NOVA Chemicals LTD of Calgary, Alberta, or Exceed resins from Exxon, or Elite resins from the Dow Chemical Company, and TAFMER (TM) linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY™ resins, are also included as another type of homogeneous ethylene/alpha-olefin copolymer useful in the present invention.

In general, the ethylene/alpha-olefin copolymer comprises a copolymer resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "corona treatment" or "corona discharge treatment" means a process in which one or both primary surfaces of a thermoplastic film are subjected to the ionization product of a gas (e.g., air) in close proximity with the film surface(s) so as to cause oxidation and/or other changes to the film surface(s).

As used herein, the term "cook" means to heat a food product thereby effecting a change in one or more of the physical or chemical properties thereof (e.g., color, texture, taste, viscosity, and the like).

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

DETAILED DESCRIPTION OF ILLUSTRATIVE EMBODIMENTS

The present invention is directed to a heat-shrinkable film suitable for cook-in applications, the film comprising a first outer layer and a second layer. The first outer layer serves as a food-contact layer and includes a polymer having a surface energy of at least about 0.034 $J/m^2$. The second layer includes a polyester, PVDC, a polyamide or polyalkylene carbonate. The film of the present invention has a transverse direction free shrink at 50° C. of less than about 2% and a transverse direction free shrink at 57° C. of at least about 3%.

The multilayer film of the present invention preferably is sequentially or biaxially oriented (preferably at least about 2:1, more preferably at least about 2.5:1, and most preferably at least 2.7:1 in at least one direction), more preferably biaxially oriented. Orienting involves initially cooling an extruded film to a solid state (by, for example, cascading water or chilled air quenching) followed by reheating the film to within its orientation temperature range and stretching it. The stretching step can be accomplished in many ways such as by, for example, "trapped bubble" or "tenter framing" techniques, both of which are well known to those skilled in the art. After being heated and stretched, the film is quenched rapidly while being maintained in its stretched configuration so as to set or lock in the oriented molecular configuration.

Generally, it is preferred that the orientation step be performed at a temperature of at least 90° C., although orientation temperatures of at least 85° C., at least 80° C., at least 75° C., at least 70° C., at least 65° C., or even at least 60° C. can be adequate for certain end use applications. Similarly, it is preferred that the orientation step be performed at a temperature of less than about 140° C., more preferably less than about 135° C., more preferably less than about 130° C., more preferably less than about 125° C., more preferably less than about 120° C., more preferably less than about 115° C., more preferably less than about 110° C., more preferably less than about 105° C., and most preferably less than about 100° C.

Following orientation, the film of the present invention is preferably cooled and then heated to an elevated temperature, most preferably to an elevated temperature less than the orientation temperature. This reheating step, which may be referred to as annealing or heat setting, is performed in order to provide film of uniform flat width. As is discussed in greater detail above, annealing to dimensionally stabilize film is well known. In accordance with the present invention, the oriented film is heated to an elevated temperature in order to provide a film which is substantially shrink-free in the transverse direction at 50° C. but which possesses at least 3% transverse free shrink at 57° C. The phrase "substantially shrink-free in the transverse direction" as used herein refers to films having less than 3% free shrink in the transverse direction, more preferably less than 2% free shrink in the transverse direction, most preferably less than 1% free shrink in the transverse direction at the designated temperature.

Thus, it is preferred that the film has a transverse direction free shrink at 40° C. of less than about 3%; more preferably, less than about 2%; and more preferably, less than about 1%.

It also is preferred that the film has a transverse direction free shrink at 42° C. of less than about 3%; more preferably, less than about 2%; and more preferably, less than about 1%.

It also is preferred that the film has a transverse direction free shrink at 44° C. of less than about 3%; more preferably, less than about 2%; and more preferably, less than about 1%.

It also is preferred that the film has a transverse direction free shrink at 46° C. of less than about 3%; more preferably, less than about 2%; and more preferably, less than about 1%.

It also is preferred that the film has a transverse direction free shrink at 48° C. of less than about 3%; more preferably, less than about 2%; and more preferably, less than about 1%.

It also is preferred that the film has a transverse direction free shrink at 50° C. of less than about 3%; more preferably, less than about 2%; and more preferably, less than about 1%.

It also is preferred that the film has a transverse direction free shrink at 52° C. of less than about 3%; more preferably, less than about 2%; and more preferably, less than about 1%.

It also is preferred that the film has a transverse direction free shrink at 54° C. of less than about 3%; more preferably, less than about 2%; and more preferably, less than about 1%.

Preferably, the film has a transverse direction free shrink at 57° C. of at least about 4%; more preferably, at least about 5%; more preferably, at least about 6%; more preferably, at least about 7%; and more preferably, at least about 8%. Similar values are preferred for the longitudinal direction free shrink.

Preferably, the film also has a transverse direction free shrink at 57° C. of less than about 15%; more preferably, less than about 12%; more preferably, less than about 11%; more preferably, less than about 10%; and more preferably, less than about 9%. In certain specific embodiments, the transverse direction free shrink at 57° C. is more preferably less than 8%; more preferably, less than 7%; and even more preferably, less than 6%.

Also, preferably, the film has a transverse direction free shrink at 80° C. of less than about 45%; more preferably, less than about 40%; more preferably, less than about 35%; more preferably, less than about 30%; more preferably, less than about 28%; more preferably, less than about 26%; more preferably, less than about 25%; more preferably, less than about 24%; more preferably, less than about 23%; more preferably, less than about 22%; more preferably, less than about 21%; more preferably, less than about 20%; and more preferably, less than about 19%. Similar values are preferred for the longitudinal direction free shrink.

Also, preferably, the transverse direction free shrink at 80° C. is at least about 5%; more preferably, at least 8%; more preferably, at least 10%; more preferably, at least 12%; more preferably, at least 14%; more preferably, at least about 15%; more preferably, at least about 16%; more preferably, at least about 17%; and more preferably, at least about 18%. Similar values are preferred for the longitudinal direction free shrink.

Preferably, the film exhibits a transverse direction shrink tension at 57° C. of at least about 0.1 MPa; more preferably, at least about 0.2 MPa; more preferably, at least about 0.3 MPa; more preferably, at least about 0.4 MPa; more preferably, at least about 0.5 MPa; more preferably, at least about 0.6 MPa; more preferably, at least about 0.7 MPa; more preferably, at least about 0.75 MPa; more preferably, at least about 0.8 MPa; and more preferably, at least about 0.85 MPa.

Preferably, the film exhibits a longitudinal direction shrink tension at 57° C. of at least about 0.1 MPa; more preferably, at least about 0.30 MPa, more preferably, at least about 0.50 MPa; more preferably, at least about 0.70 MPa; more preferably, at least about 0.80 MPa; more preferably, at least about 0.85 MPa; more preferably, at least about 0.90 MPa; and more preferably, at least about 0.95 MPa.

Preferably, the film exhibits a transverse direction shrink tension at 80° C. of at least about 0.7 MPa; more preferably, at least about 0.9 MPa; more preferably, at least about 1.1 MPa; more preferably, at least about 1.2 MPa; more preferably, at least about 1.3 MPa; more preferably, at least about 1.4 MPa; more preferably, at least about 1.5 MPa; and more preferably, at least about 1.6 MPa. Similar values are preferred for the longitudinal direction shrink tension at 80° C.

In a preferred embodiment, the longitudinal direction shrink tension at both 57° C. and 80° C. is from about 50% to about 150% of the transverse direction shrink tension at those corresponding temperatures; more preferably, from about 70% to about 130% of the transverse direction shrink tension at those corresponding temperatures; more preferably, from about 80% to about 120% of the transverse direction shrink tension at those corresponding temperatures; and even more preferably, from about 85% to about 115% of the transverse direction shrink tension at those temperatures.

The process of heating the oriented film to an elevated temperature to dimensionally stabilize it (by reducing the transverse direction free shrink) involves exposing the film to a environment with a temperature of greater than 35° C., preferably, greater than 40° C., preferably, greater than 43° C., preferably, greater than 46° C., more preferably, greater than 50° C. The actual time of exposure depends on the process employed to transfer heat to the film. For example, if the film is exposed to a heated gaseous environment for very short periods of time (of the order of a few seconds), the temperature of the environment could be as high as 200° C. However, preferably, temperatures of less than about 160° C.; more preferably, less than about 120° C.; more preferably, less than about 100° C.; more preferably, less than about 80° C.; more preferably, less than about 70° C.; more preferably, less than about 60° C.; and more preferably, less than about 55° C.; are preferred. Also, preferably, the temperature to which the film is exposed is greater than about 35° C.; more preferably, greater than about 40° C.; more preferably, greater than about 42° C.; more preferably, greater than about 44° C.; more preferably, greater than about 46° C.; more preferably, greater than about 48° C.; and more preferably, greater than about 50° C.

The time of exposure can be several hours or less than a fraction of a second. Preferably, the time of exposure is less than 1 minute, more preferably, less than 30 seconds, more preferably, less than 20 seconds, more preferably, less than 10 seconds, more preferably, less than 5 seconds; more preferably, less than 2 seconds; more preferably, less than 1 second; and more preferably, less than ½ of one second.

However, in a preferred embodiment, the film is in contact with a heated surface which is at an elevated temperature. Preferably, this involves bringing a moving web into contact with a heated surface. This mechanism provides quicker and more consistent heat-transfer to the film and results in a product which is more consistent (in width and shrink properties). Preferably, the temperature of the heated surface to which the film is exposed is less than 200° C.; more preferably, less than about 120° C.; more preferably, less than about 100° C.; more preferably, less than about 80° C.; more preferably, less than about 70° C.; more preferably, less than about 65° C.; more preferably, less than about 63° C.; more preferably, less than about 61° C; more preferably, less than about 59° C.; more preferably, less than about 57° C.; more preferably, less than about 55° C.; and more preferably, less than about 53° C. Also, preferably, the temperature of the heated surface to which the film is exposed is greater than about 35° C.; more preferably, greater than about 40° C.; more preferably, greater than about 42° C.; more preferably, greater than about 44° C.; more preferably, greater than about 46° C.; more preferably, greater than about 48° C.; and more preferably, greater than about 50° C.

More preferably, when the film is annealed (i.e., heated to an elevated temperature) to dimensionally stabilize said film, the temperature of the film reaches at least 34° C.; more preferably, at least about 36° C.; more preferably, at least about 38° C.; more preferably, at least about 40° C.; more preferably, at least about 42° C.; more preferably, at least about 44° C.; more preferably, at least about 46° C.; more preferably, at least about 48° C.; more preferably, at least about 50° C.; and more preferably, at least about 52° C. Also, preferably, the temperature which the film reaches is less than about 100° C.; more preferably, less than about 90° C.; more preferably, less than about 80° C.; more preferably, less than about 70° C.; more preferably, less than about 66° C.; more preferably, less than about 64° C; more preferably, less than about 62° C; more preferably, less than than bout 60° C.; more preferably, less than about 58° C.; more preferably, less than about 56° C.; and more preferably, less than about 54° C.

The time to which the film is exposed to this heated surface can range from several hours to less than a fraction of a second. Preferably, the time of exposure is less than 5 minutes; more preferably, less than 3 minutes; more preferably, less than 1 minute; more preferably, less than 30 seconds, more preferably, less than 20 seconds, more preferably, less than 10 seconds; more preferably, less than 5 seconds; more preferably, less than 2 seconds; more preferably, less than 1 second; and more preferably, less than 0.8 seconds, more preferably, less than 0.6 seconds and even more preferably, less than 0.4 seconds.

The film can be annealed or heated to an elevated temperature either in-line with (and subsequent to) or off-line from (in a separate process) the orientation process. For example, annealing can be performed as a part of the shirring process. However, an annealing process which is in-line with the orientation process is preferred.

While any mechanism known to those of skill in the art can be used to transfer heat to the film of the invention so that it is heated to an elevated temperature, preferably, the heat-transfer mechanism is conduction or convection, more preferably, conduction. Preferably, the film of the present invention is heated to an elevated temperature by bringing it in contact with a heated surface or surfaces followed by cooling of the film. Preferably, the heated surfaces are rolls which are subjected to the temperatures described supra.

Furthermore, the film can be annealed or heated to an elevated temperature while it is in the form of a relatively flat and collapsed film or when it is inflated or non-flat, the latter typically achieved by inflating the film with a fluid, preferably a gas such as air. The process of annealing or heat-setting of the oriented film of the present invention, wherein it is heated to an elevated temperature, can be conducted when the film is either constrained in the transverse direction or when it is unconstrained in the transverse direction. Optionally, the film may be constrained in the transverse direction by inflation with a fluid.

While it is preferred that a film having shrink characteristics in accordance with the present invention is made by orienting and subsequently annealing a preliminary film material, it is also within the scope of the present invention to provide such a film by other methods. For example, a film having the present desired shrink characteristics may be provided by orienting a preliminary film material under controlled conditions without a subsequent annealing step. Similarly, it may be possible to omit the orientation step if a film in accordance with the present invention is hot blown during the coextrusion process under the proper conditions.

Regardless of the method employed in making the present film, the first layer serves as the food-contact layer and comprises a polymer having a surface energy of at least about 0.034 J/m$^2$; more preferably at least about 0.036 J/m$^2$; more preferably at least about 0.038 J/m$^2$, more preferably at least about 0.040 J/m$^2$; more preferably at least about 0.042 J/m$^2$; more preferably at least about 0.044 J/m$^2$; and more preferably at least about 0.046 J/m$^2$. While the first layer does not have to be corona treated, in an optional embodiment, the first layer is corona treated.

The first layer preferably comprises a polar polymer; preferably one comprising functional groups that include oxygen and/or nitrogen moieties, preferably, at least one member selected from the group consisting of olefin/unsaturated acid copolymer, anhydride-containing polyolefin, polyamide and polyester. Preferably, the first layer comprises at least one member selected from the group consisting of an ethylene/unsaturated acid copolymer, propylene/unsaturated acid copolymer, butene/unsaturated acid copolymer and polyamide; more preferably, at least one member selected from the group consisting of ethylene/unsaturated acid copolymer and polyamide.

The surface energy of the polymers (sometimes also referred to as surface tension), as described here in the description of the first layer, is preferably obtained at 20° C. from wettability data, as is well known to those of skill in the art. Preferably, the geometric mean method is used to calculate the surface energy with the preferred solvents used including water and methylene iodide. Optionally, the surface energy of the polymers referenced here can be obtained from cohesive energy data. Using the techniques referenced above, polymers such as LLDPE, EVA and polypropylene homopolymer will have a surface energy less than about 0.034 $J/m^2$. On the other hand, preferred polymers of the food-contact layer in the films of this invention have surface energies typically higher than 0.034 $J/m^2$. For example, polyethylene terephthalate (a polyester) has a surface energy of about 0.043 $J/m^2$, polyamide 6 has a surface energy of about 0.044 $J/m^2$ and some ionomerized ethylene/acrylic acid copolymers have a surface energy of about 0.040 $J/m^2$.

In a preferred embodiment, the first layer comprises an ethylene/unsaturated acid copolymer comprising at least about 2% unsaturated acid mer (by weight); more preferably, at least about 4% unsaturated acid mer; more preferably, at least about 6% unsaturated acid mer; more preferably, at least about 7% unsaturated acid mer; and more preferably, at least about 8% unsaturated acid mer. Preferably, the unsaturated acid is a $C_3$–$C_{20}$ unsaturated acid, more preferably a $C_3$–$C_{10}$ unsaturated acid; more preferably, a $C_3$–$C_5$ unsaturated acid. Preferably, the unsaturated acid is acrylic acid; more preferably, at least one member selected from the group consisting of acrylic acid and methacrylic acid. In one preferred embodiment, the olefin/unsaturated acid copolymer is ionomerized; Preferably, the ionomer is an ionomer of an ethylene/acrylic acid copolymer, examples include SURLYN™ ionomer resins (E.I. DuPont de Nemours, of Wilmington, Del.).

In another preferred embodiment, the first layer comprises a polyamide. Preferably, the polyamide comprises at least one member selected from the group consisting of polyamide 6, polyamide 9, polyamide 10, polyamide 11, polyamide 12, polyamide 66, polyamide 610, polyamide 612, polyamide 6I, polyamide 6T, polyamide 69, and copolymers thereof. Still more preferably, the first layer comprises at least one member selected from the group consisting of polyamide 6, polyamide 66 and copolyamide 6/66. Preferably, the polyamide has a melting point of from about 130° C. to about 270° C.; more preferably, from about 130° C. to about 235° C.; more preferably, from about 140° C. to about 235° C.; more preferably, from about 160° C. to about 235° C.; more preferably, from about 180° C. to about 235° C.; and more preferably, from about 190° C. to about 235° C. Optionally, the first layer can comprise an amorphous polyamide. In a preferred embodiment, the first layer comprises two polyamides as described supra; preferably, a blend of a first polyamide having a melting point greater than about 180° C. (more preferably, greater than about 190° C.; and more preferably, greater than about 200° C.) with a second polyamide having a melting point less than about 180° C. (more preferably, less than about 170° C.; more preferably, less than about 160° C.). Optionally, the blend can comprise any two polyamides as described above as long as they have a different chemical structure and/or crystal structure. Thus, the polyamide, as preferred in the first layer, could comprise a blend of two polyamides, each with a melting point between 135° C. and 260° C. In a preferred embodiment, the polyamide comprises at least about 30% by weight (of the layer) of at least one member selected from the group consisting of polyamide 6, polyamide 66 and copolyamide 6/66; more preferably, at least 40%; more preferably, at least 50%; more preferably, at least 60%; and more preferably, at least 70% (by weight) of polyamide 6, polyamide 66 or copolyamide 6/66.

Optionally, the first layer can comprise a polyester. Preferably, the polyester has a melting point of from about 130° C. to about 260° C.; more preferably, from about 150° C. to about 250° C.; even more preferably from about 170° C. to about 250° C.; still more preferably, from about 180° C. to about 240° C.; still more preferably, from about 190° C. to about 240° C.; still more preferably, from about 200° C. to about 240° C.; and yet still more preferably, from about 210° C. to about 235° C. Preferably, the polyester has a terephthalic acid mer content of at least 75 mole percent; more preferably, at least 80 mole percent; more preferably, at least 85 mole percent; and even more preferably, at least 90 mole percent. In another preferred embodiment, the polyester in the first layer is an amorphous polyester, more preferably, an amorphous copolyester. Examples of suitable polyesters include PET homopolymer, PET copolymer, PEN homopolymer, and PEN copolymer.

Optionally, the first layer can comprise an anhydride-containing polyolefin; preferably, an anhydride-grafted polyolefin. The anhydride containing polyolefin can be a block copolymer, a random copolymer or a graft copolymer. Preferred examples include ethylene/unsaturated ester/maleic anhydride copolymers, sold commercially under the trade name LOTADER™ by Elf-Atochem; and polymers sold commercially under the trade name BYNEL™ by E.I. DuPont de Nemours (the latter referring to anhydride containing copolymers where the anhydride moiety is incorporated into the polyolefin by a grafting technique).

The first layer can include about 50% (by wt.), more preferably at least about 60% (by wt.), even more preferably at least about 70% (by wt.), still more preferably at least about 80% (by wt.), and most preferably at least about 90% (by wt.) of the polymers described supra. However, where desired to change or enhance the properties of the outer layer, the polymers described supra can be blended with up to about 95% (by wt.); more preferably, up to about 90%; more preferably, up to about 70%; more preferably, up to about 50%; more preferably, up to about 30%; more preferably, up to about 20%; and more preferably, up to about 10% of one or more other polymers. Useful blending polymers include, but are not limited to, polyolefins, polystyrene, polyamides, polyesters, EVOH, PVDC, polyether, polyurethane, polycarbonate, and the like. Preferred among these are those polymers that include mer units derived from ethylene, propylene, and 1-butene; more preferably, at least one member selected from the group consisting of polyethylene homopolymer, polyethylene copolymer, polypropylene homopolymer, polypropylene copolymer, polybutene homopolymer, and polybutene copolymer, more preferably, at least one member selected from the group consisting of ethylene/alpha-olefin copolymer, propylene/alpha-olefin copolymer, butene/alpha-olefin copolymer, ethylene/unsaturated acid copolymer, and ethylene/unsaturated ester copolymer, and more preferably, at least one member selected from the group consisting of linear low density polyethylene (LLDPE), ethylene vinyl acetate (EVA), propylene/ethylene copolymer, and propylene/butene copolymer. In one preferred embodiment, the first layer comprises a blend (or alloy) of a polyamide and a polyolefin (preferably, an ethylene/unsaturated acid copolymer).

In some instances, the first layer preferably can include (or consist essentially of) only those polymers containing mer units derived from $C_2$–$C_{12}$ α-olefins, ethylenically unsaturated acids, and/or unsaturated esters. Optionally, the first layer can consist essentially of only polyamide and/or polyester.

The first layer offers adequate adhesion to a wide variety of proteinaceous products, even in the absence of corona treatment. The meat-contact layers of this invention can provide consistent film-to-meat adhesion over time.

The first layer preferably has a thickness of from about 0.0025 to about 0.1 mm, more preferably from about 0.005 to about 0.04 mm, even more preferably from about 0.0075 to about 0.025 mm, and most preferably from about 0.01 to about 0.02 mm.

Generally, the thickness of the first layer is from about 1 to about 70%, preferably from about 5 to about 50%, more preferably from about 10 to about 40%, even more preferably from about 12 to about 35%, and still more preferably from about 15 to about 30% of the total thickness of the multilayer film. In one preferred embodiment, the first layer has a thickness of at least about 10%; more preferably, at least 15%; more preferably, at least 20%; more preferably, at least about 25%; more preferably, at least about 30%; more preferably, at least about 35%; and even more preferably, at least about 40% of the total thickness of the multilayer film.

Preferably, the polymer of the first layer has a melt index of from about 0.3 to about 50; more preferably from about 0.5 to about 20; still more preferably from about 0.7 to about 10; even more preferably from about 1 to about 8; and, still more preferably from about 1 to about 6 (as measured by ASTM D1238; the teaching of which is hereby incorporated, in its entirety, by reference thereto).

The present film also includes a second layer which may be an inner layer or a second outer layer. The second layer may be directly adhered to the first layer or there may be one or more additional layers between the first and second layers.

The second layer comprises at least one member selected from the group consisting of polyester, polyvinylidene chloride, polyamide, and polyalkylene carbonate; more preferably, at least one member selected from the group consisting of polyester, polyamide having a melting point greater than about 140° C., and amorphous polyamide.

In a preferred embodiment, the second layer comprises a polyamide as described supra in the description of the first layer, although it is preferred that the polyamide of the second layer is either a crystalline polyamide having a melting point of greater than about 140° C. or an amorphous polyamide. For use in the second layer of the present inventive film, crystalline polyamides which have a melting point greater than about 140° C. are preferred over those having a melting point less than about 140° C. because such higher melting point polyamides provide a desirably higher modulus and other attributes such as enhanced split resistance and elastic recovery.

Optionally, the second layer comprises a polyester; preferably as described supra in the description of the first layer.

Thus, preferably, the polyester has a melting point of from about 130° C. to about 260° C.; more preferably, from about 150° C. to about 250° C.; even more preferably from about 170° C. to about 250° C.; still more preferably, from about 180° C. to about 240° C.; still more preferably, from about 190° C. to about 240° C.; still more preferably, from about 200° C. to about 240° C.; and yet still more preferably, from about 210° C. to about 235° C. Preferably, the polyester has a terephthalic acid mer content of at least 75 mole percent; more preferably, at least 80 mole percent; more preferably, at least 85 mole percent; and even more preferably, at least 90 mole percent. In another preferred embodiment, the polyester in the second layer is an amorphous polyester, more preferably, an amorphous copolyester. Examples of suitable polyesters include PET homopolymer, PET copolymer, PEN homopolymer, and PEN copolymer.

In one optional embodiment the second layer comprises at least one member selected from the group consisting of polyester, ethylene/vinyl alcohol copolymer, polyvinylidene chloride, polyamide and polyalkylene carbonate and the film comprises less than about 90% by weight polyolefin.

The second layer preferably has a thickness of from about 0.001 to about 0.1 mm; more preferably from about 0.002 to about 0.05 mm; more preferably, from about 0.003 mm to about 0.03 mm; and more preferably, from about 0.005 to about 0.02 mm. Preferably, the thickness of the second layer is from about 1 to about 70 percent, based on total film thickness; more preferably, from about 5 to about 50 percent; more preferably, from about 8 to about 50 percent; more preferably, from about 10 to about 45 percent, more preferably, from about 13 to about 40 percent; more preferably, from about 15 to about 35 percent; more preferably, from about 17 to about 25 percent; and more preferably, from about 20 to about 25 percent. In one preferred embodiment, the second layer has a thickness of at least about 10%; more preferably, at least 15%; more preferably, at least 20%; more preferably, at least about 25%; more preferably, at least about 30%; more preferably, at least about 35%; and even more preferably, at least about 40%, based on the total thickness of the multilayer film.

The second layer can include about 50% (by wt.), more preferably at least about 60% (by wt.), even more preferably at least about 70% (by wt.), still more preferably at least about 80% (by wt.), and most preferably at least about 90% (by wt.) of the polymers described supra in the description of the second layer. The second layer can optionally include at least about 5% (by wt.), more preferably at least about 10% (by wt.), even more preferably at least about 20% (by wt.), still more preferably at least about 40% (by wt.), and most preferably at least about 50% (by wt.) of one or more polymers. Useful blending polymers include, but are not limited to, polyolefins, polystyrene, polyamides, polyesters, EVOH, PVDC, polyether, polyurethane, polycarbonate, and the like. In one preferred embodiment, the second layer comprises at least 70% by weight of one or more members selected from the group consisting of polyester, polyvinylidene chloride, polyamide having a melting point of greater than about 140° C., amorphous polyamide and polyalkylene carbonate; more preferably, at least 80% by weight of one or more members selected from the group consisting of polyester, polyvinylidene chloride, polyamide having a melting point of greater than about 140° C., amorphous polyamide and polyalkylene carbonate, more preferably, at least 90% by weight of one or more members selected from the group consisting of polyester, polyvinylidene chloride, polyamide having a melting point of greater than about 140° C., amorphous polyamide and polyalkylene carbonate; and more preferably, consists essentially of one or more members selected from the group consisting of polyester, polyvinylidene chloride, polyamide having a melting point of greater than about 140° C., amorphous polyamide and polyalkylene carbonate. However, in one preferred embodiment, the second layer consists essentially of one or more members selected from the group consisting of polyester and polyvinylidene chloride, polyamide having a melting point of greater than about 140° C., and amorphous polyamide.

The multilayer film according to the present invention can also include a third layer, the third layer preferably having a low permeance to oxygen, preferably an oxygen permeance of no more than about (in ascending order of preference) 150 $cm^3/m^2 \times atm \times 24$ hours, 125 $cm^3/m^2 \times atm \times 24$ hours, 100 $cm^3/m^2 \times atm \times 24$ hours, 75 $cm^3/m^2 \times atm \times 24$ hours, 60 $cm^3/m^2 \times atm \times 24$ hours, 50 $cm^3/m^2 \times atm \times 24$ hours, 40 $cm^3/m^2 \times atm \times 24$ hours, 30 $cm^3/m^2 \times atm \times 24$ hours, 25 $cm^3/m^2 \times atm \times 24$ hours, 20 $cm^3/m^2 \times atm \times 24$ hours, and 15 $cm^3/m^2 \times atm \times 24$ hours (at 25° C. and 0% relative humidity). The third layer preferably has a thickness of from about 0.001 to about 0.05 mm, more preferably from about 0.00125 to about 0.02 mm, even more preferably from about 0.002 to about 0.01 mm, and most preferably from about 0.0025 to about 0.005 mm. The thickness of the third layer preferably is from about 1 to about 60%; more preferably from about 2 to about 50%; even more preferably from about 3 to about 40%; still more preferably from about 4 to about 30%; yet still more preferably from about 5 to about 25%; and most preferably from about 5 to about 15%; based on the total thickness of the multilayer film.

The third layer preferably comprises at least one member selected from the group consisting of EVOH, PVDC, polyalkylene carbonate, polyamide, and polyester. In one preferred embodiment, the third layer comprises at least one member selected from the group consisting of polyamide and polyester; the polyamide and polyester which are preferred in the third layer are described supra in the description of the first layer. In another preferred embodiment, the third layer comprises EVOH having from about 32 to about 48 mole percent ethylene mer; more preferably, having from about 38 mole percent ethylene to about 46 mole percent ethylene mer.

Preferably, the multilayer film of the present invention has an oxygen permeance of no more than about (in ascending order of preference) 150 $cm^3/m^2 \times atm \times 24$ hours, 125 $cm^3/m^2 \times atm \times 24$ hours, 100 $cm^3/m^2 \times atm \times 24$ hours, 75 $cm^3/m^2 \times atm \times 24$ hours, 60 $cm^3/m^2 \times atm \times 24$ hours, 50 $cm^3/m^2 \times atm \times 24$ hours, 40 $cm^3/m^2 \times atm \times 24$ hours, 30 $cm^3/m^2 \times atm \times 24$ hours, 25 $cm^3/m^2 \times atm \times 24$ hours, 20 $cm^3/m^2 \times atm \times 24$ hours, and 15 $cm^3/m^2 \times atm \times 24$ hours (at 25° C. and 0% Relative Humidity).

Preferably, the film further comprises another layer. Preferably, this layer is in addition to the third layer described above (and therefore a fourth layer), though not necessarily so. Preferably, this layer comprises at least one member selected from the group consisting of polyolefin, polystyrene, polyamide, polyester and polyurethane (the preferred polyamide and polyester are as described in the description of the first layer);

more preferably, at least one member selected from the group consisting of polyethylene homopolymer, polyethylene copolymer, polypropylene homopolymer, polypropylene copolymer, polybutene homopolymer, polybutene copolymer (the polyolefin could be a homogeneous or a heterogeneous polyolefin); even more preferably, at least one member selected from the group consisting of ethylene/alpha-olefin copolymer, ethylene/unsaturated ester copolymer and ethylene/unsaturated acid copolymer. Still more preferably, the fourth layer comprises an ethylene-vinyl acetate copolymer. A preferred ethylene/vinyl acetate copolymer comprises from about 3 to about 28% vinyl acetate comonomer, more preferably, from about 5 to about 20% vinyl acetate comonomer, even more preferably, from about 6 to about 18% vinyl acetate copolymer and even yet still more preferably, from about 9 to about 18% vinyl acetate comonomer. In another preferred embodiment, the polyolefin in the fourth layer is a functionalized or modified polyolefin, which can serve as a tie-layer. This layer could be an outer layer or an inner layer. In the event that this layer is an outer layer, the layer more preferably comprises a polyolefin as described above.

The fourth layer can further comprise additional polymer in an amount of from about 5 to about 80% based on layer weight, more preferably from about 10 to about 40% and even more preferably, from about 10 to about 20%. Preferred additional polymers include at least one member selected from the group consisting of polyolefin, polystyrene, polyamide, polyester, polymerized ethylene vinyl alcohol, polyvinylidene chloride, polyether, polyurethane, polycarbonate, and starch-containing polymer, more preferably, at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer. In some instances, this layer could also serve as a tie layer.

The polymer of the fourth layer preferably has a melt index of from about 0.3 to about 50 (as measured by ASTM D1238); more preferably, from about 0.5 to about 20; more preferably, from about 1 to about 10; more preferably, from about 1 to about 5; and more preferably, from about 1 to about 3.

Preferably, the layer described as the fourth layer has a thickness of from about 0.001 to about 0.1 mm; more preferably, from about 0.002 mm to about 0.05 mm; more preferably, from about 0.005 mm to about 0.03 mm; and more preferably, from about 0.01 mm to about 0.02 mm. Preferably, the thickness of the fourth layer is from about 1 to about 70 percent, based on total film thickness; more preferably, from about 5 to about 50 percent; more preferably, from about 8 to about 50 percent; more preferably, from about 10 to about 45 percent; more preferably, from about 13 to about 40 percent; more preferably, from about 15 to about 35 percent, more preferably, from about 17 to about 25 percent; and more preferably, from about 20 to about 25 percent. In another embodiment, the fourth layer has a thickness of at least 3%; more preferably, at least about 5%; more preferably, at least about 10%; more preferably, at least about 20%; more preferably, at least about 30%; and more preferably, at least about 40%, based on the thickness of the multilayer film.

Preferably, the film further comprises a fifth layer. The fifth layer preferably serves as a tie-layer. As a general rule, tie layers should have a relatively high degree of compatibility with layers comprising EVOH, polyamide, polyester, PVDC, etc., as well as non-barrier layers, such as polyolefins. The composition, number, and thickness of tie layers is as known to those of skill in the art. Such a tie layer can have a thickness of from about 0.001 to about 0.05 mm, more preferably from about 0.0015 to about 0.025 mm, even more preferably from about 0.0025 to about 0.01 mm, and most preferably from about 0.003 to about 0.008 mm. Preferably, the tie layer has a thickness of from about 1 to about 70% of the total thickness of the multilayer film; more preferably, from about 1 to about 40%; more preferably, from about 2 to about 30%; more preferably, from about 2 to about 20%; more preferably, from about 2 to about 15%; more preferably, from about 2 to about 0%; and more preferably, from about 2 to about 5%. Such tie layers can include one or more polymers that contain mer units derived from at least one of $C_2$–$C_{12}$ α-olefin, styrene, amide, ester, and urethane, preferably one or more of anhydride-grafted ethylene/α-olefin interpolymer, anhydride-grafted ethylene/ethylenically unsaturated ester interpolymer, and anhydride-grafted ethylene/ethylenically unsaturated acid interpolymer.

Preferably, the film further comprises a sixth layer having a thickness and composition similar to that of the fifth layer. Preferably, the sixth layer also serves as a tie-layer.

Preferably, the film further comprises another layer comprising at least one member selected from the group consisting of polyester and polyamide. The preferred polyester and polyamide are described above in the description of the first layer. Such layers preferably have a thickness of from about 0.001 mm to about 0.1 mm, more preferably from about 0.0025 to about 0.05 mm, and most preferably from about 0.005 to about 0.025 mm. The thickness preferably is from about 1 to about 70%; more preferably from about 5 to about 60%; even more preferably from about 10 to about 50%, still more preferably from about 15 to about 45%; and most preferably from about 25 to about 40% based on the total thickness of the multilayer film.

In one preferred embodinent, the multilayer film comprises at least 40% by weight of those polymers containing mer units derived from $C_2$–$C_{12}$ α-olefins, ethylenically unsaturated acids, and/or unsaturated esters (more preferably, at least 50%; more preferably, at least 60%; more preferably, at least 70%; and more preferably, at least 80%). In another preferred embodiment, the multilayer film comprises at least 20% polyolefin (by weight); more preferably, at least 30% polyolefin; more preferably, at least 40% polyolefin; more preferably, at least 50% polyolefin, more preferably, at least 55% polyolefin; more preferably, at least 6 0% polyolefin; more preferably, at least 6 5% polyolefin; more preferably, at least 70% polyolefin; more preferably, at least 75% polyolefin; and more preferably, at least 80% polyolefin. In another preferred embodiment, the film comprises less than about 90% polyolefin by weight; more preferably, less than about 85% polyolefin; more preferably, less than about 80% polyolefin; more preferably, less than about 70% polyolefin; more preferably, less than about 60% polyolefin; more preferably, less than about 50% polyolefin; and more preferably, less than about 40% polyolefin. Optionally, the multilayer film preferably comprises from about 0–90% polyolefin (by weight); more preferably, 10–85% polyolefin;

more preferably, 30–80% polyolefin; more preferably, 40–75% polyolefin; more preferably, 45–75% polyolefin; more preferably, 50–70% polyolefin; and more preferably, 55–70% polyolefin.

In another embodiment, the multilayer film comprises less than 80% polyamide (by weight); more preferably, less than 70% polyamide; more preferably, less than 60% polyamide; more preferably, less than 55% polyamide; more preferably, less than 50% polyamide; more preferably, less than 45% polyamide; more preferably, less than 40% polyamide; more preferably, less than 35% polyamide; and more preferably, less than 30% polyamide. Also, preferably, the multilayer film comprises at least 10% polyamide by weight (more preferably, at least 15%; more preferably, at least 20%; more preferably, at least 25%; more preferably, at least 30%; and more preferably, at least 40%). Optionally, the multilayer film comprises from about 0–80% polyamide (by weight); more preferably, about 5–70% polyamide; more preferably, from about 10–60% polyamide; more preferably, from about 15–60% polyamide; more preferably, from about 15–55% polyamide; more preferably, from about 15–50% polyamide; more preferably, from about 15–45% polyamide; and more preferably, from about 20–40% polyamide. The range of preferred polyamide (based on total weight of the film) described supra is especially preferred when the polyamide is selected from the group consisting of polyamide 6, polyamide 66 and polyamide 6/66 (the range is however also applicable to any of the polyamides described above). Thus, in a preferred embodiment, the multilayer film of the invention comprises less than 80% polyamide 6, polyamide 66 and copolyamide 6/66; more preferably, less than 70% polyamide 6, polyamide 66 and copolyamide 6/66, etc.

In another embodiment, the multilayer film comprises less than 80% polyester (by weight); more preferably, less than 70% polyester; more preferably, less than 60% polyester; more preferably, less than 55% polyester; more preferably, less than 50% polyester; more preferably, less than 45% polyester; more preferably, less than 40% polyester; more preferably, less than 35% polyester; and more preferably, less than 30% polyester. Optionally, the multilayer film comprises from about 0–80% polyester (by weight), more preferably, from about 5–70% polyester; more preferably, from about 10–60% polyester; more preferably, from about 15–60% polyester; more preferably, from about 20–55% polyester; more preferably, from about 20–50% polyester; more preferably, from about 20–45% polyester; and more preferably, from about 20–40% polyester.

The film can have additional layers, these layers preferably have a thickness and composition similar to the layers described supra.

The multilayer film of the present invention preferably exhibits a sufficient Young's modulus so as to withstand normal handling and use conditions. It preferably has a Young's modulus of at least about 200 MPa; more preferably, at least about 230 MPa; more preferably, at least about 260 MPa; more preferably, at least about 300 MPa; more preferably, at least about 330 MPa; more preferably, at least about 360 MPa; and more preferably, at least about 400 MPa. (Young's modulus is measured in accordance with ASTM D 882, the teaching of which is incorporated herein by reference.) More preferably, the Young's modulus is less than about 2000 MPa; more preferably, less than about 1500 MPa; more preferably, less than about 1000 MPa; more preferably, less than about 800 MPa; more preferably, less than about 700 MPa; more preferably, less than about 650 MPa; more preferably, less than about 600 MPa; more preferably, less than about 550 MPa; and more preferably, less than about 500 MPa.

Preferably, the film according to the present invention comprises a total of from 2 to 20 layers; more preferably, from 2 to 12 layers; more preferably, from 2 to 9 layers, more preferably, from 3 to 8 layers. Optionally, the multilayer film of the invention consists of 2, 3, 4, 5, 6, 7, 8, 9, 10, 11, or 12 layers.

While adjacent layers can have the same or similar composition, preferably, adjacent layers have different compositions.

Preferably, the film has a thickness uniformity of at least 20 percent; more preferably, at least 30 percent; still more preferably, at least 40 percent; yet still more preferably, at least 50 percent; even yet still more preferably, at least 60 percent; still more preferably, at least 70 percent; still more preferably, at least 80 percent; and, still more preferably, at least 85 percent.

The multilayer film of the present invention can have any total thickness desired, so long as the film provides the desired properties, e.g. elastic recovery, shrink force, optics, modulus, seal strength, etc., for the particular packaging operation in which the film is used. The multilayer film of the present invention preferably has a total thickness of from about 0.0075 to about 0.25 mm, more preferably from about 0.0125 to about 0.125 mm, more preferably from about 0.025 to about 0.1 mm, even more preferably from about 0.035 to about 0.09 mm; more preferably, from about 0.040 to about 0.075 mm; more preferably from about 0.040 to about 0.070 mm; more preferably, from about 0.045 to about 0.065 mm; more preferably, from about 0.050 to about 0.065 mm; and more preferably, from about 0.055 to about 0.065 mm.

The multilayer film of the present invention can be irradiated and/or corona treated. The former technique involves subjecting a film material to radiation such as corona discharge, plasma, flame, ultraviolet, X-ray, gamma ray, beta ray, and high energy electron treatment, any of which can alter the surface of the film and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference. Irradiation can produce a crosslinked polymer network and is believed to enhance the ability of the film to form a tight package around a cooked meat-product. Additionally, it also facilitates the orientation process, and is also believed to improve the inter-ply adhesion between the layers, reduce edge tear, and give the film superior structural integrity and guts to better survive cook-in conditions.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. To produce crosslinking, the polymer is subjected to a suitable radiation dosage of high energy electrons, preferably using an electron accelerator, with a dosage level being determined by standard dosimetry methods. A suitable radiation dosage of high energy electrons is in the range of up to about 13–166 kGy, more preferably about 30–139 kGy, and still more preferably, 50–100 kGy. In certain embodiments, especially when the film of the invention is to be converted into bags, a lower radiation dosage is preferred. In such a scenario, a radiation dosage of from about 0–100 kGy; more preferably, 0–80 kGy; more preferably, 0–70 kGy; more preferably, 0–60 kGy; and more preferably, 0–40 kGy is preferred. Preferably, irradiation is carried out by an electron accelerator and the dosage level is determined by standard dosimetry methods. However, other accelerators such as a Van de Graaff or resonating transformer may be used. The radiation is not limited to electrons from an accelerator since any ionizing radiation may be used. A preferred amount of radiation is dependent upon the film and its end use.

If desired or necessary to increase adhesion to an enclosed meat product or for printing, all or a portion of the film of the present invention can be corona and/or plasma treated. For enhancing adhesion of the film to an enclosed meat-product, the inside surface of the packaged product is the one which would have to be affected/influenced by corona/plasma treatment. Corona/plasma treatment involves bringing a film material into the proximity of a gas (e.g., ambient air) which has been ionized. Various forms of plasma treatment known to those of ordinary skill in the art can be used to corona treat an outer surface of a thermoplastic film material. Exemplary techniques are described in, for example, U.S. Pat. Nos. 4,120,716 (Bonet) and U.S. Pat. No. 4,879,430 (Hoffman), the disclosures of which are incorporated herein by reference.

Regardless of whether or not the film of the present invention is corona treated, at least the inside (i.e., protein contact) layer thereof preferably has a surface energy of at least about 0.032 $J/m^2$, more preferably at least about 0.034 $J/M^2$, even more preferably at least about 0.036 $J/m^2$, still more preferably at least about 0.038 $J/m^2$, yet still more preferably at least about 0.040 $J/m^2$, even further more preferably at least about 0.042 $J/m^2$, and most preferably at least about 0.044 $J/m^2$.

Various combinations of layers can be used in the formation of the multilayer films according to the invention. Given below are some examples of preferred combinations in which letters are used to represent film layers (Only 2- through 4-layer embodiments are provided here for illustrative purposes; however, the multilayer films of the invention also can include more layers):

"A" represents a layer comprising a polymer having a surface energy of at least about 0.034 $J/m^2$, as described in the description of the first layer;

"B" represents a layer comprising at least one member selected from the group consisting of polyester, polyvinylidene chloride, polyamide and polyalkylene carbonate; preferably as described in the description of the second layer.

"C" represents a layer which comprises at least one member selected from the group consisting of EVOH, PVDC, polyalkylene carbonate, polyamide, and polyester, as described in the description of the third layer.

"D" represents a layer comprising at least one member selected from the group consisting of polyolefin, polystyrene, polyamide, polyester and polyurethane; preferably as described in the description of the fourth layer.

A/B, A/B/C, A/B/D, A/D/B, A/C/B, A/B/C/D, A/B/D/C, A/C/B/D, A/C//D/B, A/D/B/C, A/D/C/B, A/D/B/D, A/C/B/C, A/B/C/B, A/B/D/B.

Of course, one or more tie layers can be used in any of the above structures.

In any one of these multilayer structures, a plurality of layers (A), (B), (C), & (D) may be formed of the same or different modified compositions and one or more tie-layers added.

The films of this invention are suitable for packaging a wide variety of meat-products using a wide variety of cooking conditions. Proper cooking has three principal functions: (a) to destroy or inhibit bacterial growth which causes spoilage of the products and thus reduces shelf-life, (b) to produce desirable color development; and (c) to impart specific texture and flavor to the products. Cooking in the commercial processing of meat is done by hot air, hot water, or steam. In processing by hot air, the transfer of heat is usually slow and many of the processing schedules are related to the texture achieved in the finished product. An air cooking or smokehouse temperature of 77–80° C. is used to acquire a product internal temperature of 66–76° C. Water cooking is usually done in kettles or vats, in spray cabinets, or in steam cookers. Water cooking is more rapid than conventional air cooking. The temperatures of importance in meat processing are 52–54° C. and 64°–67° C. (147°–153° F.). The water and salt soluble protein coagulate at 52°–54° C. Collagen shrinks at 63°–67° C. On continued heating at about 65° C. or above, the collagen converts into gelatin. In order to obtain an acceptable product, the protein matrix created during tumbling and massaging has to be cooked at the appropriate temperature and rate. The ability of the muscle to bind water and form a functioning gel in a comminuted animal tissue product is given by the inherent functional properties of the muscle proteins, mainly myosin. Myosin is the major protein that strengthens the bond between adjacent pieces of meat in sectioned and formed products. However, to achieve this, it is believed that the package (film) needs to start shrinking to keep the "comminuted paste" together before the surface myosin has fully denatured. When a protein is denatured it loses its functional properties, in this case the ability of myosin to hold water and create good gel. On the other hand, in certain processed meat markets, it is also important to consider the temperatures at which starch starts gelatinizing. Much of the processed-meat products produced in many parts of the world contain anywhere from 0–18% starch. The starch type varies, depending on the producer's preference, such that some will use potato starch and others pre-gelatinized starch or so called modified starches. In any case, as the temperature of the cookhouse is increased, the starch molecules vibrate more vigorously, breaking intermolecular bonds and allowing their hydrogen-bonding sites to engage more water molecules. Usually, the higher amount of starch the higher the injection levels used. In general, starch begins to gelatinize anywhere from 59°–70° C. depending on the type of starch. Modified starches can begin gelatinizing even earlier in the cooking process. Continued heating in the presence of abundant water results in the complete loss of crystallinity, this is regarded as the gelatinization point or temperature. This usually occurs in a very narrow temperature range, for example for potato starch from about 62°–68° C. During gelatinization granules swell extensively, hence the need for a packaging material with good elastic recovery—for starch containing cook-in products. In accordance with the present invention, it is believed that if the film is not shrinking properly around the packaged product (i.e., lack of elastic recovery, free shrink and shrink force) at a given temperature, the meat protein denatures and there is more "free" water for the starch to capture. As the starch becomes "oversaturated" with water and the temperature continues to rise, the starch granules become heavy and gravitational effects cause it to precipitate. This process (retrogradation) is accompanied by water exclusion which is called syneresis and results in purge or cook-out. By a judicious choice of resin selection and annealing conditions in accordance with the present invention, properties such as elastic recovery, free shrink and shrink tension can be controlled to provide films which are robust and work with a wide variety of cooking conditions and applications.

The cooking can be conducted in a supported environment (for e.g., in molds) as well as in an unsupported environment. The cooking cycle can be such that the temperature of the cooking chamber changes gradually as a function of time (referred to as step-cooking) or can be such that a relatively constant temperature is maintained in the cooking chamber. In typical step cooking cycles, the initial temperature can be as low as 50° C. and the temperature of the chamber is then increased from 50° C. up to about 85° C. over time. Furthermore, cooking applications can include those wherein the package is slack filled with meat and then cooked in a mold or cooked unsupported. It can also include applications where the package is stuffed tightly with meat so that the radial circumference of the uncooked package is greater than the circumference of the layflat tubing/film used. The films of this invention are designed to work acceptably over a wide variety of cooking conditions and temperatures, as described above.

The film of the present invention can also be used to package a variety of products, although it can optimally be used to package proteinaceous food products, particularly meat products. Examples of meat types that can be packaged include, but are not limited to, poultry, pork, beef, lamb, fish, goat and horse. Examples of meat products that can be packaged include, but are not limited to, ham, bologna, braunschweiger, mortadella and head cheese. The meatproducts can comprise a wide variety of additives, including water, starch and other fillers. However, the films of this invention are particularly suitable for the packaging of poultry and pork products.

The following articles of manufacture can be used to yield the packaged product of the invention—a seamless casing, a backseamed casing, a bag or a pouch. A bag can be made from the film of the present invention by sealing to itself the meat-contact layers; whereby those layers becomes the inside layers of the bag. The bag can be an end-seal bag, a side-seal bag, an L-seal bag (i.e., sealed across the bottom and along one side with an open top), or a pouch (i.e., sealed on three sides with an open top). Additionally, lap seals can be employed.

The packaging just described can be done by first forming a bag from the film (as described immediately above), introducing the product into the bag, then sealing the open side of the bag. In another preferred embodiment, a seamless or backseamed casing can be clipped at one end, stuffed with meat product and then clipped or sealed at the other end to ensure a hermetic seal. Alternatively, the film of the present invention can be wrapped substantially completely around the product and then heat sealed so as to form a package. Where such a bag or package is made from a heat shrinkable film according to the present invention, the film can shrink around the product when it is subjected to heat. Where the product being packaged is a food product, it can be cooked by subjecting the entire bag or package to an elevated temperature for a time sufficient to effectuate the degree of cooking desired.

Regardless of the structure of the multilayer film of the present invention, one or more conventional packaging film additives can be included therein. Examples of additives that can be incorporated include, but are not limited to, antiblocking agents, antifogging agents, slip agents, colorants, flavorants, antimicrobial agents, meat preservatives, and the like. (The ordinarily skilled artisan is aware of numerous examples of each of the foregoing.) Where the multilayer film is to processed at high speeds, inclusion of one or more antiblocking agents in and/or on one or both outer layers of the film structure can be preferred. Examples of useful antiblocking agents for certain applications are corn starch and ceramic microspheres.

In accordance with the present invention it has been found that in order to provide a packaged product with good tightness and no/minimal cook-out, the films have to possess a combination of features. These features include specific film compositions as described above in the detailed description of the invention. These preferred film compositions are believed to provide the films of this invention with certain advantages in terms of elastic recovery (which influences package tightness) and film-to-meat adhesion. Furthermore, it is believed that the films of this invention must have at least 3% transverse direction free shrink at 57° C. in order to work effectively for a wide variety of cook-in applications. Moreover, it has been found that it is advantageous to have a film with a transverse direction shrink tension of at least about 0.3 MPa at 57° C. It has also been found that it is particularly beneficial to have films wherein the longitudinal direction shrink tension at 57° C. and 80° C. is from about 70–130% of the transverse direction shrink tension. Additionally, it has been found that the Young's modulus of the film and the cross-link density within the film (the latter influenced significantly by irradiation) play a key role in achieving package tightness and preventing cook-out. Also, film thickness is believed to also play a key role in achieving package tightness and minimizing cook-loss.

Based on the above discoveries, it is believed that the films of this invention would provide good package tightness and minimal cook-out with a wide variety of proteinaceous products, especially meat products.

The objects and advantages of this invention are illustrated by the following examples, which are provided for the purpose of representation, and are not to be construed as limiting the scope of the invention. The particular materials and amounts thereof, as well as other conditions and details, recited in these examples should not be used to unduly limit this invention. Unless stated otherwise, all percentages, parts, etc. are by weight.

EXAMPLES

Example 1

A coextruded multilayer film in the form of a tube was prepared. Film made from the tube had a structure as shown below (with the first layer being at the inside of the tube and the last layer being at the outside of the tube):

A/B/C/D/E/F/G/H/I/J wherein

A was a 0.0064 mm (6.4 micron) outer layer made from SURLYN™ 1650 ionomer of an ethylene/acrylic acid copolymer (E.I. DuPont de Nemours, of Wilmington, Del.).

B was a 0.0025 mm (2.5 micron) layer made from TYMOR™ 1203 anhydride-grafted LLDPE (Morton International; Chicago, Ill.).

C was a 0.0144 mm (14.4 micron) layer made from PE 5269T ethylene/vinyl acetate copolymer having a vinyl acetate mer content of 6.5% (Chevron Chemical Co.; Houston, Tex.).

D was a 0.0042 mm (4.2 micron) layer made from TYMOR™ 1203 anhydride-grafted LLDPE.

E was a 0.0042 mm (4.2 micron) layer made from a blend of 70% ULTRAMID™ B4, a polyamide 6, (BASF) and 30% GRILON™ CF6S, a polyamide 6/12 copolymer, (EMS American Grilon, Inc. ; Sumter, S.C.).

F was a 0.0042 mm (4.2 micron) O$_2$-barrier layer made from EVAL™ LC-E105A ethylene/vinyl alcohol copolymer (Eval Co. of America; Lisle, Ill.).

G was a 0.0050 mm (5 micron) layer made from a blend of 70% ULTRAMID™ B4 and 30% GRILON™ CF6S.

H was a 0.0042 mm (4.2 micron) layer made from TYMOR™ 1203 anhydride-grafted LLDPE.

I was a 0.0127 mm (12.7 micron) layer made from DOWLEX™ 2244 LLDPE resin (Dow Chemical Co.; Midland, Mich.).

J was a 0.0072 mm (7.2 micron) layer made from a blend of 70% DOWLEX™ 2244 LLDPE, 10% FORTIFLEX™ T60-500-119 high density polyethylene (Solvay Polymers, Inc. Deer Park, Tex.) and 20% PRIMACOR™ 1410 ethylene/acrylic acid copolymer (Dow Chemical, Midland, Mich.).

Each of the layers was extruded separately between about 170° C. and about 260° C. through an annular die heated to approximately 215° C. The resultant coextruded multilayer tube was cooled with water and flattened.

The tube was passed through an oscillating beam of an electronic crosslinking unit, where it received a total dosage of about 85 kGy. After irradiation, the flattened tape was passed through a hot water bath (held at a temperature of from about 90° C. to about 99° C.) for about thirty seconds. The heated tube was inflated into a bubble (thus orienting it) and then cooled to lock in the molecular orientation. The oriented tube was then annealed by bringing it into contact with a heated surface at approximately 55° C., whereupon the resultant film had a lay-flat width of about 19 cm and a total thickness of about 0.065 mm (65 microns). The bubble was stable, and the optics and appearance of the film were good.

Several packages of clipped casings were made from the resulting tubing, filled with two different types of an uncooked meat product. These packages were then step-cooked in a mold for 4–6 hours from an initial temperature of about 50° C. to a final cook temperature of about 80° C. After cooking, the packages were cooled down to about room temperature and then examined for various attributes including package tightness, cook-out and actual extent of film-to-meat adhesion. The results are summarized in Tables 1 & 2. The film layer that contacted the meat product was the layer denoted as A above.

Example 2

A coextruded multilayer film in the form of a tube was prepared in the same manner as described in Example 1. The film had a structure as shown below (with the first layer being at the inside of the tube and the last layer being at the outside of the tube):

A$^2$/B/C/D/E/F/G/H/I/J wherein all the layers were of the same chemical composition as in Example 1 except A$^2$; and the layer thicknesses (in mm) were as follows:

0.0051/00025/0.0148/0.0042/0.0030/0.0042/0:0042/ 0.0042/0.0152/0.0085—with the numbers from left to right representing the layers from A$^2$ through J, and in that order. Thus, the thickness of layer A$^2$ was 0.0051 mm and the thickness of layer J was 0.0085 mm.

A$^2$ had the same chemical composition as Layer E described in Example 1.

The tube was processed as described in Example 1 to produce an oriented film having the same thickness and lay-flat width as the film in Example 1. Several packages of clipped casings were made from the resulting tubing, filled with two different types of an uncooked meat product (same as that used in Example 1). These packages were then cooked and evaluated as described in Example 1. The film layer that contacted the meat product was the layer denoted as A$^2$ above. The results are summarized in Tables 1 & 2.

COMPARATIVE EXAMPLE 3

The film of Comparative Example 3 had the same thickness and chemical composition as the film of Example 2 above and was produced using the process described in Example 1. Comparative Example 3, however, was annealed by bringing it in contact with a heated surface at about 63° C. The physical properties of the film of Comparative Example 3 are summarized in Table 2. The film of Comparative Example 3 was packaged with the same meat batters described above in Examples 1 and 2, cooked and then evaluated, all as described in Example 1 above. The film layer that contacted the meat product was the layer denoted as $A^2$ above. The results are summarized in Table 1 below:

TABLE 1

Cook-in Package Evaluation

| | Poultry-based Meat Product | | | Pork-based Meat Product | | |
|---|---|---|---|---|---|---|
| Film of Ex. No. | Package Tightness | Cook-out | Protein Adhesion | Package Tightness | Cook-out | Protein Adhesion |
| 1 | Good | None/Minimal | Very good | Good | None/Minimal | Very good |
| 2 | Good | None/Minimal | Good | Good | None/Minimal | Good |
| 3 | Poor | Severe | Moderate | Poor | Severe | Moderate |

TABLE 2

Physical Properties of Film

| | Film of Ex. 1 | Film of Ex. 2 | Film of Comp. Ex. 3 |
|---|---|---|---|
| Free shrink at 57° C. (Transverse direction) | 5% | 6% | 1–2% |
| Free shrink at 57° C. (Longitudinal direction) | 6% | 6% | 4% |
| Free shrink at 80° C. (Transverse direction) | 20% | 20% | 16% |
| Free shrink at 80° C. (Longitudinal direction) | 17% | 17% | 16% |
| Free shrink at 43° C. (Transverse direction) | 0–1% | 0–1% | 0 |
| Free shrink at 50° C. (Transverse direction) | 1–2% | 1–2% | 0–1% |
| Shrink tension at 57° C. (Transverse direction) | 0.6 MPa | 0.7 Mpa | 0.2 MPa |
| Shrink tension at 57° C. (Longitudinal direction) | 0.6 MPa | 0.7 Mpa | 0.5 MPa |

In the tests with both meat products, the film of Comparative Example 3 provided a packaged product where the film was not wrapped tightly around the cooked meat product, i.e., the resulting package was somewhat flaccid. This flaccidity or looseness of the package contributed to wrinkles on the finished surface of the packaged product, an unsightly and unacceptable appearance. Furthermore, there was evidence of severe cook-out/purge loss, as evidenced by the collection of purge between the surface of the cooked meat product and the film. This purge loss resulted in increased yield loss, and furthermore, produced an unsightly package. On the other hand, with both meat products, the films of Examples 1 and 2 provided packaged products where the film was fitted snugly and tightly around the cooked meat product. There were no unsightly wrinkles on the finished surface of the packaged product. Furthermore, cook-out in these packages was non-existent or minimal, thereby resulting in a package with increased product yield. The resulting packages appeared to be acceptable in nature.

The films of Examples 1 and 2 and Comparative Example 3 were also evaluated for their degree of film-to-food product adhesion. This was conducted by cutting a thin strip of film (in contact with the cooked meat product) and peeling it pack to examine the amount of meat coverage on the meat-contact surface. While all films evidenced film-to-meat adhesion, the film of Example 1 had a greater covering of meat-protein on the meat-contact surface than the films of Example 2 and Comparative Example 3. This is attributable to the differences in meat-adhesion between the ionomerized ethylene/acrylic acid copolymer resin (which served as the meat-contact layer of Example 1) and the polyamide meat-contact layer of the films of Example 2 and Comparative Example 3. However, what was surprising and totally unexpected was the fact that the film of Example 2 had better film-to-food product adhesion than the film of Comparative Example 3. This was evidenced by a somewhat thicker, more uniform covering of meat-protein on the meat-contact surface of the film of Example 2 (when compared to that of Comparative Example 3). Since the films of Example 2 and Comparative Example 3 have the same chemical composition and layer gauge thickness and therefore, the same meat-contact surface, one would have expected to see both films having the same amount of film-to-meat adhesion. Therefore, the fact that the film of Example 2 had superior film-to-meat adhesion than the film of Comparative Example 3 is evidence of the superior package attainable in accordance with the present invention. It is believed that the heat-treatment at an elevated temperature, i.e., annealing, influences film-to-product adhesion by changing the morphology and crystallinity of the food-contact layer of the film. The film of Example 2 utilized optimized heat-treatment conditions to maximize the film-to-product adhesion in accordance with the present invention.

Various modifications and alterations that do not depart from the scope and spirit of this invention will become apparent to those skilled in the art. This invention is not to be unduly limited to the illustrative embodiments set forth herein.

What is claimed is:

1. A heat-shrinkable film suitable for cook-in applications comprising:
    a) a first outer layer, said outer layer serving as a food-contact layer, said outer layer comprising a polymer having a surface energy of at least about 0.034 J/m$^2$ and
    b) a second layer, said second layer comprising at least one member selected from the group consisting of polyester, polyvinylidene chloride, polyamide and polyalkylene carbonate;
    wherein said film has a transverse direction free shrink at 57° C. of at least about 3% and a transverse direction free shrink at 50° C. of less than about 2%.

2. The film according to claim 1, wherein the film further comprises a third layer comprising at least one member selected from the group consisting of ethylene/vinyl alcohol copolymer, polyvinylidene chloride, polyalkylene carbonate, polyamide, and polyester.

3. The film according to claim 1, wherein the second layer comprises at least one member selected from the group consisting of polyamide 6, polyamide 66, polyamide 6/66 and polyvinylidene chloride.

4. The film according to claim 1, wherein the first layer comprises an ethylene/unsaturated acid copolymer.

5. The film according to claim 1, wherein the film comprises less than 80% polyamide.

6. The film according to claim 1, wherein the film comprises from about 30 to about 80% polyolefin.

7. The film according to claim 1, wherein at least one of the layers is crosslinked.

8. The film according to claim 1, wherein the multilayer film has a thickness from about 0.040 mm to about 0.070 mm.

9. The film according to claim 1, wherein the film has a Young's Modulus of less than about 700 MPa.

10. The film according to claim 1 wherein the film has an oxygen permeance of less than about 40 $cm^3/m^2 \times atm \times 24$ hours.

11. The film according to claim 1, wherein the film has a transverse direction free shrink at 57° C. of at least about 5%.

12. The film according to claim 1, wherein the film has a transverse direction free shrink at 54° C. of less than about 2%.

13. The film according to claim 1, wherein the film has a transverse direction free shrink at 52° C. of less than about 1%.

14. The film according to claim 1, wherein the film has a transverse direction shrink tension at 57° C. of at least about 0.3 MPa.

15. The film according the claim 13, wherein the film has a transverse direction shrink tension at 57° C. of at least about 0.5 MPa.

16. The film according to claim 1, wherein the film has a longitudinal direction shrink tension at 57° C. which is from about 70% to about 130% of the transverse direction free shrink at 57° C.

17. The film according to claim 1, wherein the film has a transverse direction free shrink at 57° C. of less than about 10%.

18. The film according to claim 1, wherein the second layer comprises at least one member selected from the group consisting of polyester, polyvinylidene chloride, polyamide having a melting point greater than about 140° C., amorphous polyamide, and polyalkylene carbonate.

19. The film according to claim 1, wherein the film has a transverse direction free shrink at 80° C. of at least about 10% and less than about 25%.

20. A heat-shrinkable film suitable for cook-in applications comprising:
    a) a first outer layer, said outer layer serving as a food-contact layer, said outer layer comprising a polymer having a surface energy of at least about 0.034 $J/m^2$ and
    b) a second layer, said second layer comprising at least one member selected from the group consisting of polyester, polyvinylidene chloride, polyamide and polyalkylene carbonate;
        wherein the film has been heated to an elevated temperature to dimensionally stabilize the film;
        and wherein the film has a transverse direction free shrink at 57° C. of at least about 3%.

21. The film according to claim 20, wherein the film has a transverse direction free shrink at 57° C. of at least about 5%.

22. The film according to claim 20, wherein the film has a transverse direction shrink tension at 57° C. of at least about 0.3 MPa.

23. The film according to claim 20, wherein the second layer comprises at least one member selected from the group consisting of polyester, polyvinylidene chloride, polyamide having a melting point greater than about 140° C., amorphous polyamide, and polyalkylene carbonate.

24. The film according to claim 20, wherein the film has a longitudinal direction shrink tension at 57° C. which is from about 70% to about 130% of the transverse direction free shrink at 57° C.

25. The film according to claim 20, wherein the film has a transverse direction free shrink at 80° C. of at least about 10% and less than about 25%.

26. The film according to claim 20, wherein the first outer layer comprises at least one member selected from the group consisting of olefin/unsaturated acid copolymer, anhydride-containing polyolefin, polyamide and polyester.

27. The film according to claim 20, wherein the first outer layer comprises at least one member selected from the group consisting of olefin/unsaturated acid copolymer and polyamide.

28. A heat-shrinkable film suitable for cook-in applications comprising:
    a) a first outer layer, said outer layer serving as a food-contact layer, said outer layer comprising a polymer having a surface energy of at least about 0.034 $J/m^2$ and
    b) a second layer, said second layer comprising at least one member selected from the group consisting of polyester, ethylene/vinyl alcohol copolymer, polyvinylidene chloride, polyamide and polyalkylene carbonate;
        said film comprising less than about 90% polyolefin;
        and wherein said film has a transverse direction free shrink at 57° C. of at least about 3%, a transverse direction free shrink at 50° C. of less than about 2% and a transverse direction free shrink at 80° C. of less than about 26%.

29. A heat-shrinkable film suitable for cook-in applications comprising:
    a) a first outer layer, said outer layer serving as a food-contact layer, said outer layer comprising a polymer having a surface energy of at least about 0.034 $J/m^2$ and
    b) a second layer, said second layer comprising at least one member selected from the group consisting of polyester, ethylene/vinyl alcohol copolymer, polyvinylidene chloride, polyamide and polyalkylene carbonate;
        said film comprising less than about 90% polyolefin;
        wherein said film has been heated to an elevated temperature to dimensionally stabilize the film;
        and wherein said film has a transverse direction free shrink at 57° C. of at least about 3% and a transverse direction free shrink at 80° C. of less than about 26%.

30. A process for making a heat shrinkable film suitable for use in cook-in applications comprising the steps of:
    coextruding at least a first outer layer, said outer layer serving as a meat-contact layer, said outer layer comprising a polymer having a surface energy of at least about 0.034 $J/m^2$ and a second layer, said second layer comprising at least one member selected from the group consisting of polyester, polyvinylidene chloride, polyamide and polyalkylene carbonate,
    cooling the coextruded layers, thereby forming a preliminary tape;
    orienting the tape at an orientation temperature of at least 60° C. and no greater than 140° C., thereby forming a preliminary heat shrinkable film material;

allowing the preliminary heat shrinkable film material to cool; and heating the preliminary heat shrinkable film material to an elevated temperature of at least about 35° C. and no greater than 100° C., thereby providing a heat shrinkable film having a transverse direction free shrink at 57° C. of at least about 3% and a transverse direction free shrink at 50° C. of less than about 2%.

* * * * *